3,421,897
METHOD OF PREPARING FOOD SUPPLEMENT
James R. Simmons, Chicago, and Arthur Rapport, Glencoe, Ill., assignors to Simmons Milk Products, Inc., a corporation of Illinois
No Drawing. Filed May 19, 1965, Ser. No. 457,214
U.S. Cl. 99—2                5 Claims
Int. Cl. A23c 21/00

ABSTRACT OF THE DISCLOSURE

Production of a food supplement by incubating a condensed cultured whey having a major proportion of solids content with an iron-containing carrier until at least 0.5 weight percent iron is extracted from the carrier into the whey to provide a usable iron supplement in the whey.

---

This invention relates to comestibles and more particularly relates to food supplements which are normally liquid but are carried on a solid carrier to provide a free-flowing, substantially non-hygroscopic, particulate, nutritive supplement and a method for producing the same.

It is a general object of this invention to provide a new and useful food supplement and a method for producing the same.

It is a more particular object of this invention to provide such a food supplement product and method in which an iron-containing carrier, such as vermiculite, is used and in which iron from the carrier is converted to a usable form of iron in the food supplement.

Another object of this invention is to provide a new and useful whey supplement absorbed on a vermiculite carrier and containing iron extractive in useful form on the carrier.

Other objects will be apparent from the description of this invention given herein.

Recently it has been proposed to render normally liquid animal feeds, or food supplements for animal feeds, more easily handled by absorbing them on a variety of solid carriers to provide a free-flowing particulate product. We have now found that when condensed whey is intimately mixed with an iron-containing solid absorbent carrier, such as vermiculite, and the mixture is permitted to cure, the whey on the carrier in the resulting product contains ferric iron in a usable form, possibly a soluble form such as ferric lactate, which may be digested and utilized by the animal.

According to the present method, the carrier and condensed whey are mixed together and then permitted to cure so as to form a product in which the whey is absorbed on the carrier and iron is extracted from the carrier by the whey, thereby providing usable iron in the resulting product. Curing temperatures are not critical since the function of the curing is merely the extraction of iron by the whey from the carrier. For example, the curing can be carried out by merely permitting the material to stand for a sufficient time to fully absorb the whey on the carrier and solubilize and extract a significant amount of iron from the carrier. Curing is carried out with the whey in absorbed liquid state and under conditions below the vaporization or destruction temperatures of the desirable whey components.

The product formed by the method is a condensed whey absorbed on the carrier and preferably contains a minor portion of carrier and a major portion of whey. The whey has usually been condensed by evaporation to an extent where it preferably contains a major portion of solids component and only a minor portion of liquid component, the liquid component containing a significant amount of lactic acid. Usually the product also contains at least about 1 to 5% ferric iron within the whey portion, based on lactic acid content of the whey portion. For example, a product prepared according hereto and having about 10% lactic acid will usually contain at least about 0.5% iron in the whey.

We have found that a specifically preferred product may contain carrier and whey in a ratio of about 1:3. Of course, greater amounts of carrier and/or whey can be used as desired. Because of a general lack of food value in the carrier portion, usually only sufficient amounts of carrier will be used as needed to provide the non-hygroscopic, free-flowing, particulate food supplement.

The carrier can be any inorganic iron-containing carrier material, usually an exfoliated vermiculite, all such vermiculites having acceptable iron contents. The iron content of the carrier should be sufficient to provide the desired amount of iron for extraction by the whey. In the products prepared by the examples given herein, the vermiculite carrier used was a vermiculite sold under the tradename "Verxite." Verxite is a refined mineral material prepared from a layered hydrous silicate essentially in the ratio of 1:1 jeffersite:biotite, commonly known as hydrobiotite, that has been heat-treated and subsequently processed so as to give a product containing in excess of 98% pure exfoliated mineral.

As a typical example of a useful whey, a condensed and cultured whey can be prepared by recovering whey, having an acidity of about 0.55%, from a cheese vat at a temperature of about 100° F. The recovered whey is delivered to culture tanks for culturing at about atmospheric temperature for about 12 hrs., resulting in raising the acidity to about 1%. The resulting cultured whey is pumped through a preheater at a temperature of about 190° F. and is held in the preheater for about 30 secs. The whey is then charged to an evaporator supply tank. From the supply tank, the cultured whey is conducted to an evaporator to condense the whey to about 62% solids under high vacuum. The evaporation is carried out in a multiple-effect evaporator, and the last stage or effect is maintained at a temperature not exceeding 120° F. The resulting condensed cultured whey can be cooled for use as a feed to the present method.

A condensed cultured whey, prepared according to the above typical example, was analyzed and found to have the following components in the percents given:

| Ingredients: | Percent |
|---|---|
| Lactose | 38 |
| Lactic acid | 10 |
| Crude protein | 7 |
| Ash | 7 |
| Crude fat, minimum | ½ |
| Water | 37½ |
| Total | 100 |

According to a typical example of the present method, 75 lbs. of the above prepared and analyzed condensed cultured whey were mixed with 25 lbs. of Verxite in a rubber-tipped blade mixer at atmospheric temperature until an intimate mixture was obtained. The resulting mixture was placed in a curing tank for 24 hrs. at room temperature. Thereafter, the cured mixture was processed through a feed-finisher, consisting of a hammer mill with stationary hammers, to break the material into divided particles of the desired size. The resulting free-flowing particulate food supplement material was packaged in paper bags having plastic liners.

A series of products were prepared by the method of the above typical example. The products were analyzed and it was found that the whey portion of the product contained a significant iron content. However, because of the possibility of iron being introduced from other sources during processing, a series of seventeen product samples were prepared by laboratory procedures as follows:

In preparing each sample, 1 part by weight Verxite was mixed with 3 parts by weight of the above-identified condensed cultured whey in a porcelain vessel. The mixture was permitted to stand in the vessel for 24 hrs. curing, and the resulting sample was then analyzed for the percentage of iron in the whey portion. Separation of the whey portion from the carrier and the analysis of the whey portion was accomplished using conventional procedures. The soluble ferric iron content for ten of these samples analyzed is given as follows:

| Sample No. | Soluble ferric iron content wt. percent |
|---|---|
| 1 | 0.60 |
| 2 | 0.58 |
| 3 | 0.61 |
| 4 | 0.60 |
| 5 | 0.59 |
| 6 | 0.62 |
| 7 | 0.60 |
| 8 | 0.59 |
| 9 | 0.61 |
| 10 | 0.61 |

The results of the analysis established that a significant amount of the iron is extracted from the carrier by the whey. The iron is present in the whey in a soluble and usable form.

All percents given herein are percents by weight unless otherwise indicated.

The foregoing detailed description is given for clearness of understanding only and no unnecessary limitations are to be understood therefrom, as some modifications will be obvious to those skilled in the art.

We claim:

1. A method for producing a food supplement which comprises a carrier and whey having a usable iron component extracted from the carrier, which method comprises heating cultured whey until the whey is condensed by evaporation to the extent where it contains a major proportion of solids component and only a minor proportion of liquid component and an increased lactic acid content, mixing the condensed whey with an iron-containing carrier, ad without prior drying, curing the resulting mixture until sufficient iron is extracted from the carrier to provide a food supplement having an appreciable usable iron content extracted from said carrier.

2. The method of claim 1 wherein said curing step is at ambient temperature.

3. The method of claim 1 wherein said iron content extracted from said carrier is at least 0.5% by weight based on said condensed whey.

4. A method for producing a food supplement of whey absorbed on an iron-containing solid particulate carrier, which method comprises heating cultured whey until the whey is condensed by evaporation to the extent where it contains a major proportion of solids component and only a minor proportion of liquid component and an increased lactic acid content, cooling the condensed whey and mixing the cooled condensed whey with the iron-containing carrier and, without prior drying, curing the resulting mixture until an iron content of at least about 0.5% by weight is imparted to the whey by extraction from the carrier, whereby the resulting food supplement has a usable iron content.

5. A method for producing a food supplement which comprises a vermiculite carrier and whey having a usable iron component extracted from the carrier, which method comprises preheating cultured whey having an acidity of about 1% to a temperature of about 190° F., holding said preheated whey at said temperature for about 30 sec., evaporating said cultured whey to form condensed cultured whey having a solids content of about 62% and lactic acid content of about 10% at a temperature no greater than 120° F., cooling the condensed whey to a temperature of about 90° F., mixing about 75 parts by weight of the condensed cultured whey with about 25 parts by weight of exfoliated vermiculite at atmospheric temperature, curing the resulting mixture at ambient temperature for about 24 hrs., and particulizing the resulting mixture to provide the food supplement having a usable iron content extracted by said whey from said vermiculite.

References Cited

UNITED STATES PATENTS

| 2,465,905 | 3/1949 | Meade et al. | 99—57 X |
| 3,130,054 | 4/1964 | Parker | 99—2 |

RAYMOND N. JONES, *Primary Examiner.*

S. E. HEYMAN, *Assistant Examiner.*

U.S. Cl. X.R.

99—57